June 23, 1936.   F. E. MARSH ET AL   2,044,991
ARTICLE AND METHOD BY WHICH "BEN DAY" TONES ARE PHOTOGRAPHICALLY PRODUCED
Original Filed May 8, 1934

FAYETTE E. MARSH
CHARLES H. ANDERSEN
INVENTORS

BY
ATTORNEY

Patented June 23, 1936

2,044,991

UNITED STATES PATENT OFFICE 2,044,991

ARTICLE AND METHOD BY WHICH "BEN DAY" TONES ARE PHOTOGRAPHICALLY PRODUCED

Fayette E. Marsh and Charles H. Andersen, Los Angeles, Calif., assignors to Charles V. Price, Los Angeles, Calif.

Original application May 8, 1934, Serial No. 724,534. Divided and this application May 20, 1935, Serial No. 22,339

8 Claims. (Cl. 95—5)

This invention relates to improvements in methods of preparing printing plates by the photo-engraving or lithographic process, with special regard to the means of introducing into the said plates shades or tones, generally known as "Ben Day" patterns.

It is well known in the engraving art, that "Ben Day" tones or shades may be introduced into the plates from which a printed image is produced by one of several methods which fall into two general classifications. By methods in the first of these classifications, the pattern is placed directly upon the plate in ink before it is etched, and by methods in the second classification the pattern is introduced into the camera copy and thereafter transferred to the plate as a component part of the image to be reproduced, by the means regularly employed in the art. The improved process, provided by this invention, falls within the latter classification and photographically produces a negative into which negative has been introduced or added the desired tones or shades in "Ben Day" pattern. This copy or negative containing the added shades or tones is then used as camera copy for reproduction of plates by the engraver.

This invention further relates to improvements in the Method of photographically producing "Ben Day" tones, patented May 8, 1934, #1,957,790; and carries forward some of the important steps outlined therein.

This invention still further relates to improvements in the Method of photographically producing "Ben Day" tones patented Nov. 19, 1935, No. 2,021,191.

This invention is a divisional application of our parent application filed May 8, 1934; Serial Number 724,534 entitled Article and method by which "Ben Day" tones are photographically produced, patented Nov. 5, 1935, No. 2,019,500.

We have discovered in the operation of the process described in the above methods that by photographing different reflective coloring matters through a stencil in "Ben Day" or other pattern, there is produced on the camera film a negative image of the stencil, reduced or enlarged, in the areas colored, depending upon the light reflective value of the coloring matter being photographed. Neither is the process limited to opaque coloring matters only.

For example, if the stencil used contains small round openings of a mesh of 60 to an inch, which openings make up 50% of the total area of the stencil, white reflective coloring matter will register on the film in the camera a pattern of black dots which are considerably larger than the openings in the stencil and green or semi-transparent reflective coloring matter will register on the film a pattern of black dots which are considerably smaller than the openings in the stencil.

Upon the discovery and knowledge of the foregoing facts and their utilization are based the foundation for new improvements which constitute the essence of the present invention.

Important objects are listed as follows:

First, the invention contemplates the elimination of certain steps disclosed in the parent application first referred to supra, whereby the operation is simplified and the cost of manufacture is reduced.

Second, the comparative ease by which a multiplicity of graduated tones may be produced.

Third, it provides a means whereby plates can be remade, should the plates become damaged or broken.

Fourth, it provides an article of manufacture.

Other objects, not listed, will be apparent when viewed in the light of the drawing and what is claimed; also how much of the cost of producing tones or shades on printing plates is eliminated and how the engraving art is greatly enriched by the ease and flexibility of its use, especially in the making of so-called "color plates".

With the use of the embodiment shown in the accompanying drawing, the article and method whereby "Ben Day" tones are photographically produced will now be disclosed.

The following is a brief description of the figures in the drawing.

The disclosure of the article and method whereby "Ben Day" tones or shades are photographically introduced into a given subject now follows step by step.

Figure 1:
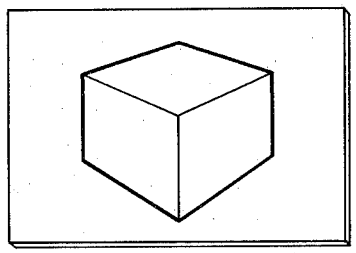
Fig. 1 represents the master drawing.
Figure 2:
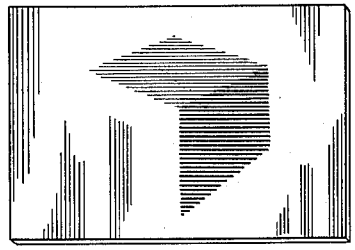
Fig. 2 represents the transparent overlay on which coloring materials have been laid.
Figure 3:
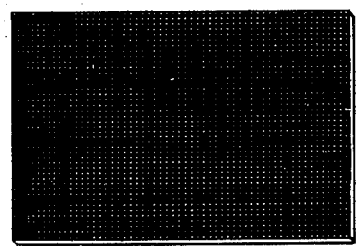
Fig. 3 represents a transparent sheet on which a "Ben Day" pattern has been printed in opaque ink called a stencil.

First, we provide a suitable subject to be shaded which in the present instance is termed a master drawing and represents a cube (block). Such a subject is shown in Fig. 1.

Next, we superimpose on the face of the master drawing a transparent sheet and upon said sheet lay various reflective coloring materials, having different reflective coloring values, corresponding to the areas on which different values of the "Ben Day" pattern are to subsequently appear in the photographic negative.

Pursuant to this plan we color that area white where we wish to produce on the corresponding area of the film in the camera, a dark "Ben Day" tone or shade, and that area blue-green where we wish to produce on the corresponding area of the film in the camera, a light "Ben Day" tone or shade.

Other areas, we color in intermediate tones of blue-green to white, where we wish to produce on the corresponding area of the film in the camera, intermediate "Ben Day" tones.

A similar arrangement of other reflective coloring matters having different reflective values may be utilized to produce like results and therefore can be used interchangeably.

Figure 4:
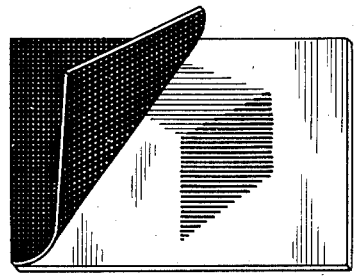
Fig. 4 represents a composite assembly of the transparent overlay shown in Fig. 2 and the stencil shown in Fig. 3, positioned so that the transparency can be photographed thru the stencil.

Next we remove the overlay from the master drawing and position it before the camera for reproduction and superimpose on the overlay in that position, a stencil in "Ben Day" pattern. The assembly at this stage of the process is represented in Fig. 4. The assembly is then photographed and the negative produced is represented in Fig. 5 and constitutes the article.

It will be noticed that when the overlay is removed from the master drawing and photographed thru the stencil, the lines of the drawing are not reproduced on the photographic negative obtained, but it rather contains only the varying values of "Ben Day" patterns resulting from photographing the coloring materials previously laid upon the overlay. When and if the lines of the master drawing are to be carried into the negative, we use the process disclosed in the pending application of which this is a division.

Figure 5:
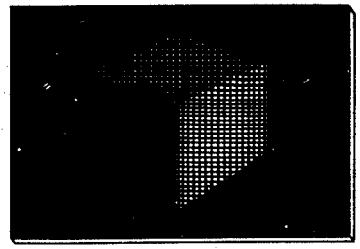
Fig. 5 represents the photographic image in negative form, produced by photographing the assembly shown in Fig. 4.

The negative represented by Fig. 5 is a commercial product valuable to the trade as known for printing to metal in the making of etched plates.

The invention contemplates broadly the method of photographing various reflective coloring matters, having different reflective values, through a transparency on which has been imprinted, on one of the faces thereof, a "Ben Day" pattern.

It has been disclosed, step by step, by the method hereinbefore described. Whether the various reflective coloring matters are placed on the "Ben Day" stencil or on the transparency, is considered patentably immaterial, so long as the stencil and the coloring matter is contiguous. This would be interpreted as meaning, placing the coloring matter on the transparency against the stencil design itself, as stated supra, or placing the various reflective coloring matters on a transparency and then placing the imprinted side of the stencil against the coloring matter and photographing the combination.

It should be understood that the present disclosure is for the purpose of illustration only and that this invention includes all modifications and equivalents which fall within the scope of what is claimed.

We claim:

1. The method of producing "Ben Day" tones or shading effects which consists in providing a master drawing to be toned, superimposing upon said drawing a transparency, coloring the areas on said transparency with materials having different reflective coloring values corresponding to the areas of the drawing on which tones are desired when reproduced by printing, separating the transparency from the drawing and making a negative by photographing the transparency and the colored areas thereon thru a stencil in "Ben Day" pattern.

2. The method of producing "Ben Day" tones upon a negative which consists in superposing a transparency upon a drawing, coloring the areas on the transparency corresponding to the areas of the drawing on which tones are desired when reproduced by printing with materials having different color reflective values, separating the transparency from the drawing and photographing the transparency and the colored areas thereon thru a stencil in "Ben Day" pattern.

3. A photographic negative made by photographing a transparency, provided with areas colored with materials having different color reflective values, thru a stencil in "Ben Day" pattern.

4. The method of producing "Ben Day" tones upon a photographic negative which consists in superposing a transparency upon a drawing on which tones are desired when reproduced by printing, coloring the areas on the transparency corresponding to the areas of the drawing on which tones are desired with materials having different color reflective values, separating the transparency from the drawing and photographing the transparency and the colored areas thereon thru a stencil in "Ben Day" pattern.

5. The method of producing "Ben Day" tones which consists in coloring areas on a transparency with materials having different color reflective values and photographing the same thru a stencil in "Ben Day" pattern.

6. An article comprising a composite arrangement of a transparency having in selected areas thereof suitable reflective coloring matters having different reflective values forming a background, and a transparency containing a pattern in "Ben Day" through which said background is photographable.

7. An article comprising a composite arrangement of two transparencies, one transparency including suitable reflective coloring matters having different reflective values placed in selected areas thereon photographable thru the second transparency and the second transparency being provided with a "Ben Day" stencil and placed nearest the camera.

8. The method of photographing reflective coloring matters selectively positioned on a transparency, which have been applied with materials having different reflective values, through a transparency containing a "Ben Day" pattern to produce a negative whereon different shades or tones of the "Ben Day" pattern occur, substantially as described.

FAYETTE E. MARSH.
CHARLES H. ANDERSEN.